US009294607B2

(12) United States Patent
Jacobsen et al.

(10) Patent No.: US 9,294,607 B2
(45) Date of Patent: Mar. 22, 2016

(54) HEADSET COMPUTER (HSC) AS AUXILIARY DISPLAY WITH ASR AND HT INPUT

(71) Applicant: Kopin Corporation, Westborough, MA (US)

(72) Inventors: Jeffrey J. Jacobsen, Hollister, CA (US); Christopher Parkinson, Richland, WA (US); Stephen A. Pombo, Campbell, CA (US); James Woodall, West Bridgford (GB); David Hollick, West Bridgford (GB)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 14/540,853

(22) Filed: Nov. 13, 2014

(65) Prior Publication Data
US 2015/0072672 A1    Mar. 12, 2015

Related U.S. Application Data

(62) Division of application No. 13/799,570, filed on Mar. 13, 2013, now Pat. No. 8,929,954.

(60) Provisional application No. 61/638,419, filed on Apr. 25, 2012, provisional application No. 61/653,474, filed on May 31, 2012, provisional application No. 61/748,444, filed on Jan. 2, 2013, provisional application No. 61/749,155, filed on Jan. 4, 2013.

(51) Int. Cl.
*G06F 3/0484* (2013.01)
*H04M 1/725* (2006.01)
(Continued)

(52) U.S. Cl.
CPC .......... *H04M 1/72527* (2013.01); *G06F 3/011* (2013.01); *G06F 3/012* (2013.01);
(Continued)

(58) Field of Classification Search
CPC ....... G06F 3/011; G06F 3/012; G06F 3/0482; G06F 3/04842; G06F 3/167
See application file for complete search history.

(56) References Cited

U.S. PATENT DOCUMENTS

| 5,005,213 A | 4/1991 | Hanson et al. |
| 5,594,469 A | 1/1997 | Freeman et al. |

(Continued)

FOREIGN PATENT DOCUMENTS

| CN | 1797299 A | 7/2006 |
| CN | 101581969 A | 11/2009 |

(Continued)

OTHER PUBLICATIONS

EP 12782481.1 Supplemental European Search Report, "Context Sensitive Overlays in Voice Controlled Headset Computer Displays," dated Sep. 29, 2014.

(Continued)

*Primary Examiner* — David Bilodeau
(74) *Attorney, Agent, or Firm* — Hamilton, Brook, Smith & Reynolds, P.C.

(57) ABSTRACT

The present invention related to human/computer interfaces and more particularly to a headset computing display device that accepts voice commands and tracks head motions to provide command inputs to and receive display information from a software application executed on a host computing device. An example embodiment of the present invention includes a method of, and corresponding system for, operating a native Smartphone or PC application, simultaneously displaying an output of the application through the Smartphone or PC screen and a headset computing display device, and using speech and head tracking commands to control the native application. The present invention enables hands-free operation of a Smartphone or PC application.

28 Claims, 10 Drawing Sheets

(51) Int. Cl.
*G06F 3/16* (2006.01)
*G06F 3/01* (2006.01)
*G06F 3/0482* (2013.01)

(52) U.S. Cl.
CPC ......... *G06F 3/0482* (2013.01); *G06F 3/04842* (2013.01); *G06F 3/16* (2013.01); *G06F 3/167* (2013.01); *H04M 1/7253* (2013.01)

(56) References Cited

U.S. PATENT DOCUMENTS

| | | | |
|---|---|---|---|
| 5,990,793 A | 11/1999 | Bieback | |
| 6,010,216 A | 1/2000 | Jesick | |
| 6,084,556 A | 7/2000 | Zwern | |
| 6,108,197 A | 8/2000 | Janik | |
| 6,198,462 B1 | 3/2001 | Daily et al. | |
| 6,204,974 B1 | 3/2001 | Spitzer | |
| 6,313,864 B1 | 11/2001 | Tabata et al. | |
| 6,325,507 B1 | 12/2001 | Jannard et al. | |
| 6,369,952 B1 | 4/2002 | Rallison et al. | |
| 6,538,676 B1 | 3/2003 | Peters | |
| 6,778,906 B1 | 8/2004 | Hennings et al. | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Garnd et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannar et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,501,995 B2 | 3/2009 | Morita et al. | |
| 7,512,414 B2 | 3/2009 | Jannard et al. | |
| 7,620,432 B2 | 11/2009 | Willins et al. | |
| 7,620,433 B2 | 11/2009 | Bodley | |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,760,898 B2 | 7/2010 | Howell el al. | |
| 7,798,638 B2 | 9/2010 | Fuziak et al. | |
| 7,806,525 B2 | 10/2010 | Howell et al. | |
| 7,918,556 B2 | 4/2011 | Lewis | |
| 7,959,084 B2 | 6/2011 | Wulff | |
| 7,966,189 B2 | 6/2011 | Le et al. | |
| 7,967,433 B2 | 6/2011 | Jannard et al. | |
| 7,969,383 B2 | 6/2011 | Eberl et al. | |
| 7,969,657 B2 | 6/2011 | Cakmakci et al. | |
| 7,976,480 B2 | 7/2011 | Grajales et al. | |
| 7,988,283 B2 | 8/2011 | Jannard | |
| 7,997,723 B2 | 8/2011 | Pienimaa et al. | |
| 8,010,156 B2 | 8/2011 | Warran | |
| 8,020,989 B2 | 9/2011 | Jannard et al. | |
| 8,025,398 B2 | 9/2011 | Jannard | |
| 8,072,393 B2 | 12/2011 | Riechel | |
| 8,092,011 B2 | 1/2012 | Sugihara et al. | |
| 8,098,439 B2 | 1/2012 | Amitai et al. | |
| 8,108,143 B1 | 1/2012 | Tester | |
| 8,123,352 B2 | 2/2012 | Matsumoto et al. | |
| 8,140,197 B2 | 3/2012 | Lapidot et al. | |
| 8,170,262 B1 | 5/2012 | Liu | |
| 8,184,983 B1 | 5/2012 | Ho et al. | |
| 8,212,859 B2 | 7/2012 | Tang et al. | |
| 8,577,427 B2 | 11/2013 | Serota | |
| 8,862,186 B2 | 10/2014 | Jacobsen et al. | |
| 8,885,719 B2 | 11/2014 | Kondo et al. | |
| 8,929,954 B2 | 1/2015 | Jacobsen et al. | |
| 9,122,307 B2 | 9/2015 | Jacobsen et al. | |
| 2001/0003712 A1 | 6/2001 | Roelofs | |
| 2002/0015008 A1 | 2/2002 | Kishida et al. | |
| 2002/0030649 A1 | 3/2002 | Zavracky et al. | |
| 2002/0065115 A1 | 5/2002 | Lindholm | |
| 2002/0094845 A1 | 7/2002 | Inasaka | |
| 2002/0154070 A1 | 10/2002 | Sato et al. | |
| 2003/0016253 A1 | 1/2003 | Aoki et al. | |
| 2003/0065805 A1 | 4/2003 | Barnes, Jr. | |
| 2003/0067536 A1 | 4/2003 | Boulanger et al. | |
| 2003/0068057 A1 | 4/2003 | Miller et al. | |
| 2004/0193413 A1 | 9/2004 | Wilson et al. | |
| 2004/0210852 A1 | 10/2004 | Balakrishnan et al. | |
| 2004/0267527 A1 | 12/2004 | Creamer et al. | |
| 2005/0237296 A1 | 10/2005 | Lee | |
| 2005/0245292 A1 | 11/2005 | Bennett et al. | |
| 2005/0264527 A1 | 12/2005 | Lin | |
| 2006/0010368 A1 | 1/2006 | Kashi | |
| 2006/0028400 A1 | 2/2006 | Lapstun et al. | |
| 2006/0061551 A1 | 3/2006 | Fateh | |
| 2006/0109237 A1 | 5/2006 | Morita et al. | |
| 2006/0132382 A1 | 6/2006 | Jannard | |
| 2006/0166705 A1 | 7/2006 | Seshadri et al. | |
| 2006/0178085 A1 | 8/2006 | Sotereanos et al. | |
| 2006/0221266 A1 | 10/2006 | Kato et al. | |
| 2007/0009125 A1 | 1/2007 | Frerking et al. | |
| 2007/0053544 A1 | 3/2007 | Jhao et al. | |
| 2007/0093279 A1 | 4/2007 | Janik | |
| 2007/0103388 A1 | 5/2007 | Spitzer | |
| 2007/0180979 A1 | 8/2007 | Rosenberg | |
| 2007/0220108 A1 | 9/2007 | Whitaker | |
| 2007/0238475 A1 | 10/2007 | Goedken | |
| 2007/0265495 A1 | 11/2007 | Vayser | |
| 2008/0052643 A1 | 2/2008 | Ike et al. | |
| 2008/0055194 A1 | 3/2008 | Baudino et al. | |
| 2008/0144854 A1 | 6/2008 | Abreu | |
| 2008/0180640 A1 | 7/2008 | Ito | |
| 2008/0198324 A1 | 8/2008 | Fuziak | |
| 2008/0239080 A1 | 10/2008 | Moscato | |
| 2009/0002640 A1 | 1/2009 | Yang et al. | |
| 2009/0079839 A1 | 3/2009 | Fischer et al. | |
| 2009/0093304 A1 | 4/2009 | Ohta | |
| 2009/0099836 A1 | 4/2009 | Jacobsen et al. | |
| 2009/0117890 A1 | 5/2009 | Jacobsen et al. | |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2009/0204410 A1 | 8/2009 | Mozer et al. | |
| 2009/0251409 A1 | 10/2009 | Parkinson et al. | |
| 2010/0020229 A1 | 1/2010 | Hershey el al. | |
| 2010/0033830 A1 | 2/2010 | Yung | |
| 2010/0053069 A1 | 3/2010 | Tricoukes et al. | |
| 2010/0119052 A1 | 5/2010 | Kambli | |
| 2010/0121480 A1 | 5/2010 | Stelzer et al. | |
| 2010/0128626 A1 | 5/2010 | Anderson et al. | |
| 2010/0141554 A1 | 6/2010 | Devereaux et al. | |
| 2010/0156812 A1 | 6/2010 | Stallings et al. | |
| 2010/0171680 A1 | 7/2010 | Lapidot et al. | |
| 2010/0182137 A1 | 7/2010 | Pryor | |
| 2010/0238184 A1 | 9/2010 | Janicki | |
| 2010/0250231 A1 | 9/2010 | Almagro | |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2010/0302137 A1 | 12/2010 | Benko et al. | |
| 2010/0306711 A1 | 12/2010 | Kahn et al. | |
| 2011/0001699 A1 | 1/2011 | Jacobsen et al. | |
| 2011/0089207 A1 | 4/2011 | Tricoukes et al. | |
| 2011/0090135 A1 | 4/2011 | Tricoukes et al. | |
| 2011/0092825 A1 | 4/2011 | Gopinathan et al. | |
| 2011/0134910 A1 | 6/2011 | Chao-Suren et al. | |
| 2011/0187640 A1 | 8/2011 | Jacobsen et al. | |
| 2011/0214082 A1 | 9/2011 | Osterhout et al. | |

(56) References Cited

U.S. PATENT DOCUMENTS

| | | |
|---|---|---|
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0068914 A1 | 3/2012 | Jacobsen et al. |
| 2012/0075177 A1 | 3/2012 | Jacobsen et al. |
| 2012/0105740 A1 | 5/2012 | Jannard et al. |
| 2012/0114131 A1 | 5/2012 | Tricoukes et al. |
| 2012/0166203 A1 | 6/2012 | Fuchs et al. |
| 2012/0188245 A1 | 7/2012 | Hyatt |
| 2012/0236025 A1 | 9/2012 | Jacobsen et al. |
| 2012/0287284 A1 | 11/2012 | Jacobsen et al. |
| 2012/0302288 A1 | 11/2012 | Born et al. |
| 2013/0070930 A1 | 3/2013 | Johnson |
| 2013/0174205 A1 | 7/2013 | Jacobsen et al. |
| 2013/0288753 A1 | 10/2013 | Jacobsen et al. |
| 2013/0289971 A1 | 10/2013 | Parkinson et al. |
| 2013/0300649 A1 | 11/2013 | Parkinson et al. |
| 2014/0003616 A1 | 1/2014 | Johnson et al. |
| 2014/0059263 A1 | 2/2014 | Rosenberg et al. |
| 2014/0093103 A1 | 4/2014 | Breece, III et al. |
| 2014/0235169 A1 | 8/2014 | Parkinson et al. |
| 2014/0368412 A1 | 12/2014 | Jacobsen et al. |
| 2015/0039311 A1 | 2/2015 | Clark et al. |
| 2015/0072672 A1 | 3/2015 | Jacobsen et al. |

FOREIGN PATENT DOCUMENTS

| | | |
|---|---|---|
| CN | 101599267 A | 12/2009 |
| JP | 2001-100878 A | 4/2001 |
| JP | 2001-506389 A | 5/2001 |
| JP | 2001-216069 A | 8/2001 |
| JP | 2002-525769 A | 8/2002 |
| JP | 2008-052590 A | 3/2008 |
| JP | 2009-179062 A | 8/2009 |
| WO | WO 95/21408 | 8/1995 |
| WO | WO 95/23994 | 9/1995 |
| WO | WO 99/01838 | 1/1999 |
| WO | WO 00/17848 | 3/2000 |
| WO | WO 00/79327 | 12/2000 |
| WO | WO 2009/076016 | 6/2009 |
| WO | WO 2009/120984 A1 | 10/2009 |
| WO | WO 2010/129679 A1 | 11/2010 |
| WO | WO 2011/051660 | 5/2011 |
| WO | WO 2012/040107 A1 | 3/2012 |
| WO | WO 2012/040386 | 3/2012 |

OTHER PUBLICATIONS

Notification of Transmittal of the International Search Report and the Written Opinion of the International Searching Authority, or the Declaration, Date of Mailing: Dec. 5, 2013 in re: PCT/US2013/036221, Title "Headset Computer (HSC) as Auxiliary Display With ASR and HT Input."

International Preliminary Report on Patentability, PCT/US2013/036221, "Headset Computer (HSC) as Auxiliary Display With ASR and HT Input", Date of Mailing: Nov. 6, 2014.

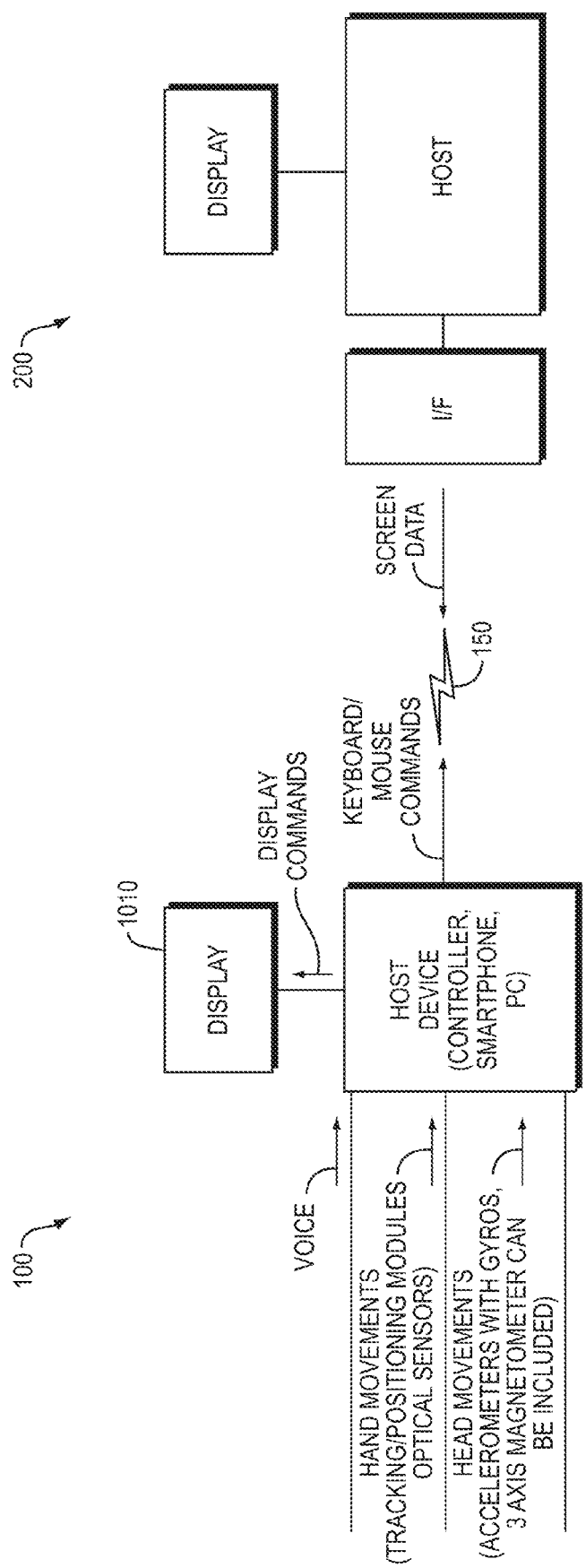

HEADSET COMPUTER (HSC) AS AUXILIARY DISPLAY WITH ASR AND HT INPUT

RELATED APPLICATION(S)

This application is a divisional of U.S. application Ser. No. 13/799,570, filed Mar. 13, 2013, which claims the benefit of U.S. Provisional Application No. 61/638,419 by Jacobsen et al., entitled "Improved Headset Computer" filed on Apr. 25, 2012, U.S. Provisional Application No. 61/653,474 by Jacobsen et al., entitled "Headset Computer (HSC) As Auxiliary Display With ASR And HT Input" filed on May 31, 2012, and U.S. Provisional Application No. 61/748,444 by Parkinson et al., entitled "Smartphone API For Processing VGH Input" filed on Jan. 2, 2013 and U.S. Provisional Application No. 61/749,155 by Parkinson et al., entitled "Smartphone Application Programming Interface (API) For Controlling HC Differently From Smartphone Display" filed on Jan. 4, 2013.

This application is related to U.S. application Ser. No. 12/774,179 by Jacobsen et al., entitled "Remote Control Of Host Application Using Motion And Voice Commands" filed May 5, 2010, which claims the benefit of U.S. Provisional Application No. 61/176,662, filed on May 8, 2009 entitled "Remote Control of Host Application Using Tracking and Voice Commands" and U.S. Provisional Application No. 61/237,884, filed on Aug. 28, 2009 entitled "Remote Control of Host Application Using Motion and Voice Commands".

The entire teachings of the above application(s) are incorporated herein by reference.

BACKGROUND OF THE INVENTION

The present application relates to human/computer interfaces and more particularly to a headset computing display device that accepts voice commands and tracks head motions to provide command inputs to and receive display information from a software application executed on a remote host computing device.

Mobile computing devices, such as notebook personal computers (PC's), Smartphones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such devices is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display positioned within the field of view of the user, similar in format to eyeglasses, an audio headset, or video eyewear. A "wireless computing headset" device includes one or more small high-resolution micro-displays and optics to magnify the image. The WVGA micro-displays can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility than hands dependent devices.

For more information concerning such devices, see co-pending U.S. application Ser. No. 12/348,646 entitled "Mobile Wireless Display Software Platform for Controlling Other Systems and Devices," by Parkinson et al., filed Jan. 5, 2009, PCT International Application No. PCT/US09/38601 entitled "Handheld Wireless Display Devices Having High Resolution Display Suitable For Use as a Mobile Internet Device," by Jacobsen et al., filed Mar. 27, 2009, and U.S. Application No. 61/638,419 entitled "Improved Headset Computer," by Jacobsen et al., filed Apr. 25, 2012, each of which are incorporated herein by reference in their entirety.

Example embodiments of the present invention include a method of, and corresponding system for, operating a Smartphone or PC application, including executing an application on a Smartphone or PC, the executed application being native to the Smartphone or PC. The invention method and system generating an output of the native application for simultaneous display through the Smartphone or PC screen and a headset computing display device. In one embodiment, display output for the headset computing device is in a markup language. The headset computing device translates the received display output for rendering through the headset display in response to requesting and receiving the display output generated by the Smartphone or PC. The headset computing device operating in a speech recognition and head tracking user interface mode, monitors for recognized user speech (voice commands) and head tracking commands (head motions) from an end-user wearing the headset computing device. The headset computing device in response to received speech recognition and head tracking commands—end-user inputs—translates the received speech recognition and head tracking commands to equivalent Smarthphone or PC commands (e.g., touch-screen, keyboard, and/or mouse commands) and transmitting the equivalent commands to the Smartphone or PC to control the native application.

A further example embodiment of the present invention includes a method of, and corresponding system for, operating a Smartphone (or PC) including executing a native image and/or video viewing application on a Smartphone. The embodiment operates a headset computing device in a speech recognition and head tracking user interface mode, monitoring for user speech recognition and head tracking commands from an end-user at the headset computing device. The embodiment translating received speech recognition and head tracking commands to equivalent Smartphone commands at the headset computing device in response to received speech recognition and head tracking commands. The equivalent Smartphone commands include capturing an image or video on a display of the headset computing device, transmitting the equivalent Smartphone command to the Smartphone to control the native image and video viewing application, and displaying the captured image and/or video through the headset computing display device and through the Smartphone display, simultaneously.

The example embodiments may further include, the use of a markup language included with generated display output, such as Hyper Text Markup Language 5 (HTML5). Example embodiments may present to the end-user menu selections and prompts in terms of speech recognition and head tracking commands, such as audible and visual prompts. A wireless communications link between the host Smartphone or PC and the headset computing device. May use wireless communications links such as Bluetooth or Wi-Fi wireless standards.

Still further example embodiments may further still effectively enable a speech recognition and hands-free user interface and control of the native application executed on a Smartphone or PC.

Further example methods of, and corresponding devices for, displaying on a headset computer output from a Smartphone application. Embodiments execute an application on the Smartphone generating output of the executed application for display through a headset computer. The Smartphone configures and transmits instructions in a description language indicating actions for the headset computer to display the output of the executed application. Embodiments receive over low bandwidth at the headset computer the configured instructions, and in response thereto, the headset computer forms a display of the generated output based on indicated actions to perform. The actions include any of on screen notifications, messages, graphical elements, request to play one of a plurality of predefined sound sequences and control a component of the headset computer.

The actions of the respective element types, and for each element type, the instructions can indicate one of a plurality of styles predefined for the headset computer. The description language can be HTML 5 or other markup language. The formed display rendered at the headset in the headset domain can include menu selections and prompts presented in terms of a speech recognition/head tracking user interface. The menu selections and outputs can be audibly and visually presented to a user. The receiving by the headset computer and the transmitting by the Smartphone can be over a wireless communications link. The wireless communications link can be any of Bluetooth, Wi-Fi or other protocol.

Example methods can further include monitoring for input from a speech recognition/head tracking user interface at the headset computer. In response to a received speech recognition/head tracking command input, the headset computer translates the received speech recognition/head tracking command to an equivalent Smartphone command and transmits the equivalent Smartphone command to the Smartphone to control the executed application. The display by the headset computer can effectively enable speech and hands-free user interaction with the Smartphone.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a block diagram showing data and control communications of the example embodiment of FIGS. 1A-1B according to principles of the present invention.

DETAILED DESCRIPTION OF THE INVENTION

A description of example embodiments of the invention follows.

A Headset Computer (HSC), having computational and operational capabilities sufficient at least for use as an auxiliary display and end-user input device, is operationally connected to a "host" (or alternatively "main" or "controller") computing device enabling a conventional software application executed on the host to be displayed simultaneously through the host and the HSC and controlled using end-user inputs received at the HSC. Host computing devices may include Smartphones, tablets or personal computers (PC's). The HSC and host can be operatively couple using wires or preferably wirelessly.

According to an example method of the present invention, a Smartphone or PC can be the primary (or main) computing device, and the HSC can be an auxiliary display and user interface to the Smartphone or PC computing device. The Smartphone or PC can run its own native software using its own display in a conventional and customary manner. The HSC alone cannot execute such a software application due to its lack of traditional user interface hardware, such as a touch screen, keyboard, and/or mouse. Therefore, in order to accommodate hands-free computing, the Smartphone or PC can execute a second class of application that, while running directly on the Smartphone or PC, is specifically designed to use the HSC as a display output for the native application and to use the Automatic Speech Recognizer (ASR) and Head-Tracker (HT) functionally built into the HSC user input devices.

In example embodiments of the present invention, the HSC contains at least sufficient computational and operational capabilities to: (i) display a screen-full of information; (ii) monitor head-gesture tracking and feed head-movement information back to the main computer (e.g., Smartphone or PC); and, (iii) monitor and process speech, feeding speech recognition results back to the main computer. By pairing the HSC with the main computer (Smartphone or PC), the main computer may effectively hold specially created hands-free applications that primarily run on the main computer, but use the display of and augmented input from the HSC.

In one embodiment the HSC may take the form of the HSC described in a co-pending U.S. patent application Ser. No. 13/018,999, entitled "Wireless Hands-Free Computing Headset With Detachable Accessories Controllable By Motion, Body Gesture And/Or Vocal Commands" by Jacobsen et al., filed Feb. 1, 2011, which is hereby incorporated by reference in its entirety.

Figure 1A:
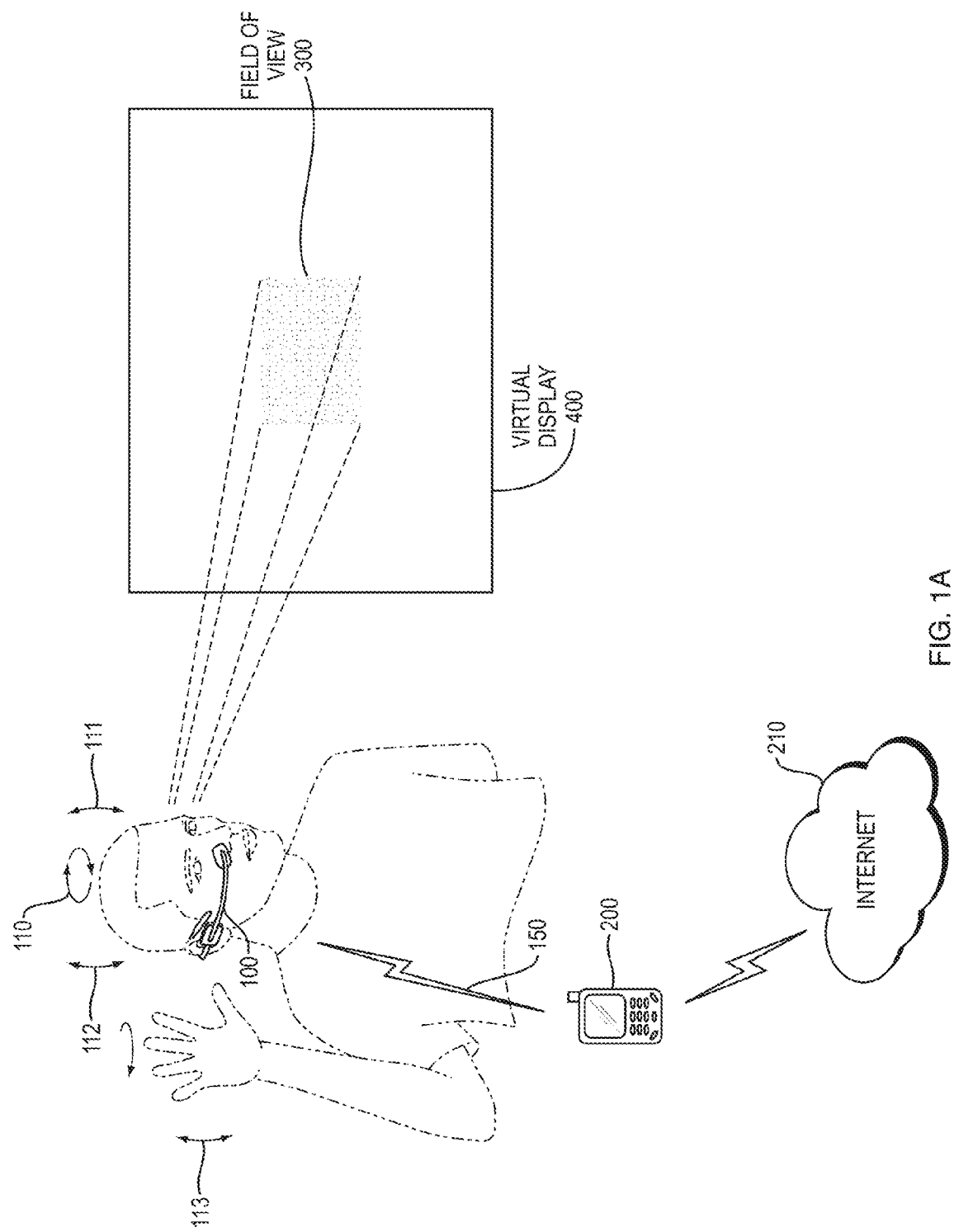
FIG. 1A illustrates an example embodiment of a headset computing device communicating with a host computing device (e.g., Smartphone, PC, etc.) according to principles of the present invention.
Figure 1B:
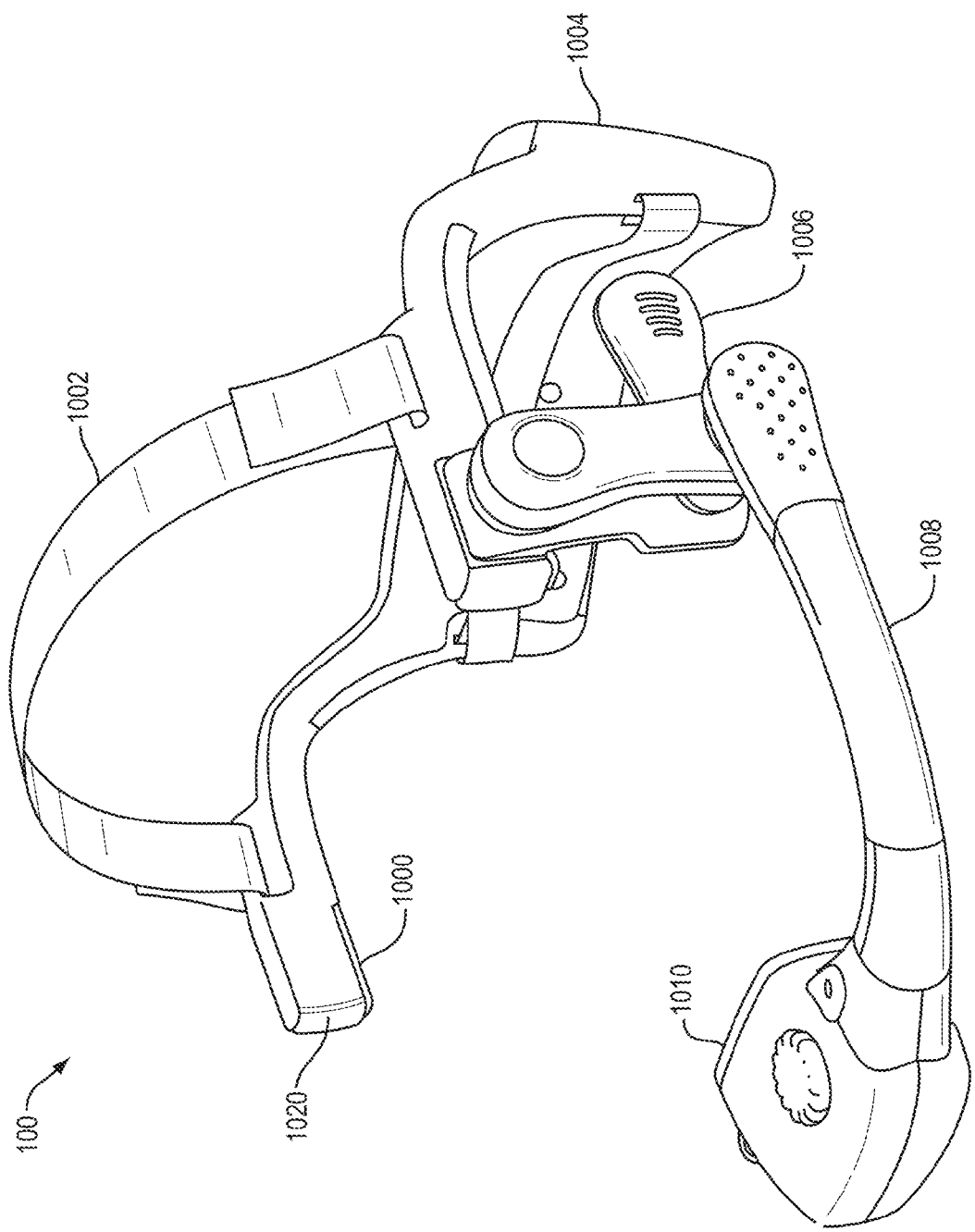
FIG. 1B is a perspective view of an example embodiment of a headset computer.

FIGS. 1A and 1B show an example embodiment of a wireless computing headset device 100 (also referred to herein as a headset computer (HSC)) that incorporates a high-resolution (VGA or better) micro-display element 1010, and other features described below. HSC 100 can include audio input and/or output devices, including one or more microphones, speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multi-core processors), one or more wired and/or wireless communications interfaces, memory or storage devices, various sensors and a peripheral mount or mounts, such as a "hot shoe."

Example embodiments of the HSC 100 can receive user input through recognizing voice commands, sensing head movements, 110, 111, 112 and hand gestures 113, or any combination thereof. Microphone(s) operatively coupled or preferably integrated into the HSC 100 can be used to capture speech commands which are then digitized and processed using automatic speech recognition (ASR) techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. The voice command automatic speech recognition and head motion tracking features such a user interface overcomes the hands-dependant formats of other mobile devices.

The headset computing device 100 can be used as a remote auxiliary display for streaming video signals received from a remote host computing device 200 (shown in FIG. 1A). The host 200 may be, for example, a notebook PC, Smartphone, tablet device, or other computing device having sufficient computational complexity to communicate with the HSC 100, execute a native application, generate and transmit an output display feed and receive user input commands from the HSC 100. The host may be further capable of connecting to other networks 210, such as the Internet. The HCS 100 and host 200 can wirelessly communicate via one or more wireless protocols, such as Bluetooth®, Wi-Fi, WiMAX or other wireless radio link 150. (Bluetooth is a registered trademark of Bluetooth Sig, Inc. of 5209 Lake Washington Boulevard, Kirkland, Wash. 98033.)

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone(s), micro-display subassembly 1010, and peripheral port 1020.

A head worn frame 1000 and strap 1002 are generally configured so that a user can wear the headset computer device 100 on the user's head. A housing 1004 is generally a low profile unit which houses the electronics, such as the microprocessor, memory or other storage device, low power wireless communications device(s), along with other associated circuitry. Speakers 1006 provide audio output to the user so that the user can hear information, such as the audio portion of a multimedia presentation, or audio prompt, alert, or feedback signaling recognition of a user command.

Micro-display subassembly 1010 is used to render visual information, such as images and video, to the user. Micro-display 1010 is coupled to the arm 1008. The arm 1008 generally provides physical support such that the micro-display subassembly is able to be positioned within the user's field of view, preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 with micro-display 1010 can enable an end-user to select a field of view 300 (FIG. 1A) within a much larger area defined by a virtual display 400. The user can typically control the position, extent (e.g., X-Y or 3D range), and/or magnification of the field of view 300.

While the example embodiments of an HSC 100 shown in FIGS. 1A-1B are monocular micro-displays presenting a single fixed display element supported within the field of view in front of the face of the user with a cantilevered boom, it should be understood that other mechanical configurations for the auxilliary display device HSC 100 are possible.

FIG. 2 is a block diagram showing high-level details of the HSC device 100, host 200 and the data that travels between them. A bi-directional communications link 150 can be established between the HSC 100 and the host computing device 200 (for more details of such a communications link see U.S. Pat. No. 8,355,671 entitled "Method And Apparatus For Transporting Video Signal Over Bluetooth Wireless Interface" issued Jan. 15, 2013, which is herein incorporated by reference in its entirety).

In an example embodiment of the present invention, an external "smart" device 200 (also referred to herein as a "host" device or "controller") is used in conjunction with a HSC 100 to provide information and hands-free control to a user. The example embodiment uses the transmission of small amounts of data between the host 200 and HSC 100, and, thus, provides a more reliable data transfer method and control method for real-time control.

A preferred embodiment involves the collaboration between two devices, one of which is an HSC 100. The other device (controller or host) is a smart device 200, which is a device that executes an application, processes data and provides functionality to the user. Example controllers include, but are not limited to, Smartphones, tablets and laptops.

The controller 200 and HSC 100 can be paired over a suitable transport, typically a wireless bi-directional communications link, such as Bluetooth. Because the amount of data transferred by such a suitable protocol is low, the transport can be shared with other, activities requiring higher bandwidth.

The controller 200 can run software, such as a second class of application, running at a top layer of a software stack, that enables it to send instructions to the HSC 100. In order to avoid having to send data outlining the entire screen contents on the HSC 100, the controller 200 instead can send instructions that the HSC 100 can interpret using software functioning on the HSC 100. The instructions sent from the controller 200 can describe actions to perform, including on-screen notifications, messages and other graphical elements. Such instructions can also include requests to play one of a set of pre-set (predefined) sound sequences or control other components of the HSC 100.

The instructions can further include pre-set "styled elements". Styled elements can include short-hand instructions or code relating to how to lay out a display screen, which text to display, text font, font size, and other stylistic element information such as drawing arrows, arrow styles and sizes, background and foreground colors, images to include or exclude, etc. Therefore, for each element type (notification, message, textbox, picturebox, etc.) there are multiple display styles. The styled elements can allow the controller 200 great flexibility in how information is displayed on the HSC 100. In this way, for given information, visual elements displayed on the HSC 100 can differ from the visual elements displayed on the display of controller 200.

Higher bandwidth activities can be requested while the bi-directional communications protocol is transferring display instruction. Higher bandwidth traffic can be separate from the low bandwidth traffic of the present invention. For example, the HSC 100 can be utilized for a video call, whereby a request is sent to acquire access and control of the display, camera and audio communications peripherals (microphone and speaker) and to display live video and play live audio on the HSC 100. Such requests can be part of the accessory protocol (e.g., low bandwidth instructions for HSC 100), but the high bandwidth video call traffic can be outside of it.

Through the transmission of styled elements the amount of data to be transmitted over the connection 150 is small-simple instructions on how to lay out a screen, which text to display, and other stylistic information, such as drawing arrows, or the background colors, images to include, etc. Additional data can be streamed over the same link 150, or another connection and displayed on screen 1010, such as a video stream if required by the controller 200.

In another embodiment, after the bi-directional communications link is established, a software application native to the host computing device can be executed by the host 200 processor. The native application can generate a feed of output images for display. So that the output images may be used for multiscreen display, a second class of application can be executed by the host to append the output images with a markup language, such as Hyper Text Markup Language 5 (HTML5). The host can communicate the marked-up display data to the HSC 100 for simultaneous display of application output through the displays of both the host device 200 and the HSC 100 but in respective format, layout, user-interface. The HSC 100 may process the marked-up display data to present available menu selections and prompts to the end-user of HSC 100 so that the end-user can interface through HSC 100 with the application running on the host 200 in a hands-free manner. For example, a visual prompt may include one or more text boxes indicating recognized verbal commands and/or arrows or other motion indicators indicating head tracking (and/or hand motion) commands. Audio prompts may, for example, include a text-to-speech machine recitation of recognized verbal commands.

The HSC device 100 can receive vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These command inputs can be translated by software in the HSC device 100 into equivalent host device 200 commands (e.g., touch gesture, keyboard and/or mouse commands) that are then sent over the Bluetooth or other wireless interface 150 to the host 200. The host 200 then can interpret the translated equivalent commands in accordance with the host operating system and executed native application software to perform various functions.

Among the equivalent commands may be one to select a field of view 300 (FIG. 1A) within the virtual display 400 and return that selected screen data to the HSC device 100. Thus, it should be understood that a very large format virtual display area might be associated with application software or an operating system running on the host 200. However, only a portion of that large virtual display area 400 within the field of view 300 can be returned to and actually displayed by the micro-display 1010 of HSC device 100.

Figure 3A:
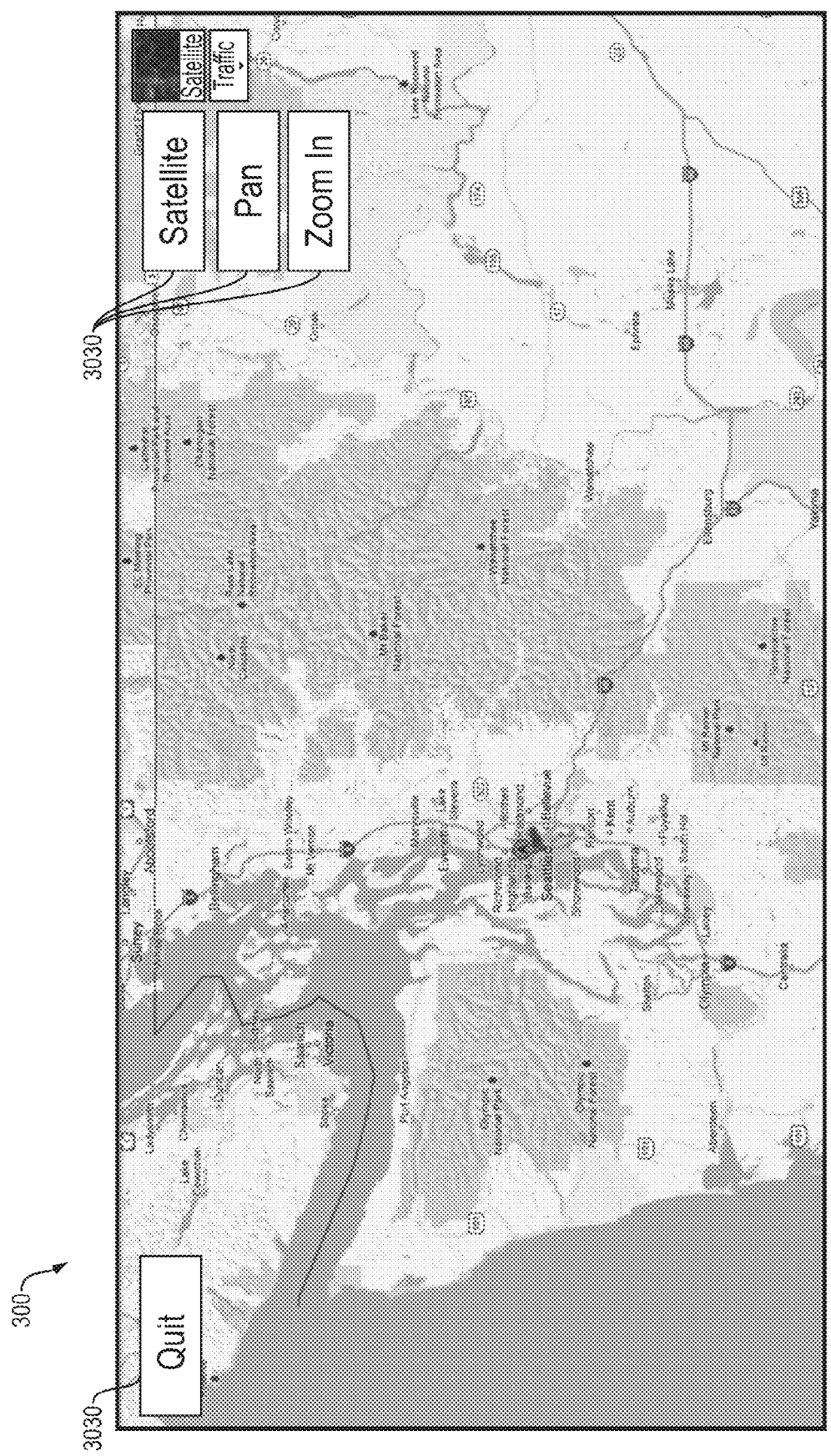
FIGS. 3A-3B illustrate an example of executing a native application on a host computing device (Smartphone or PC) using the headset computing device in accordance with principles of the present invention.
Figure 3B:
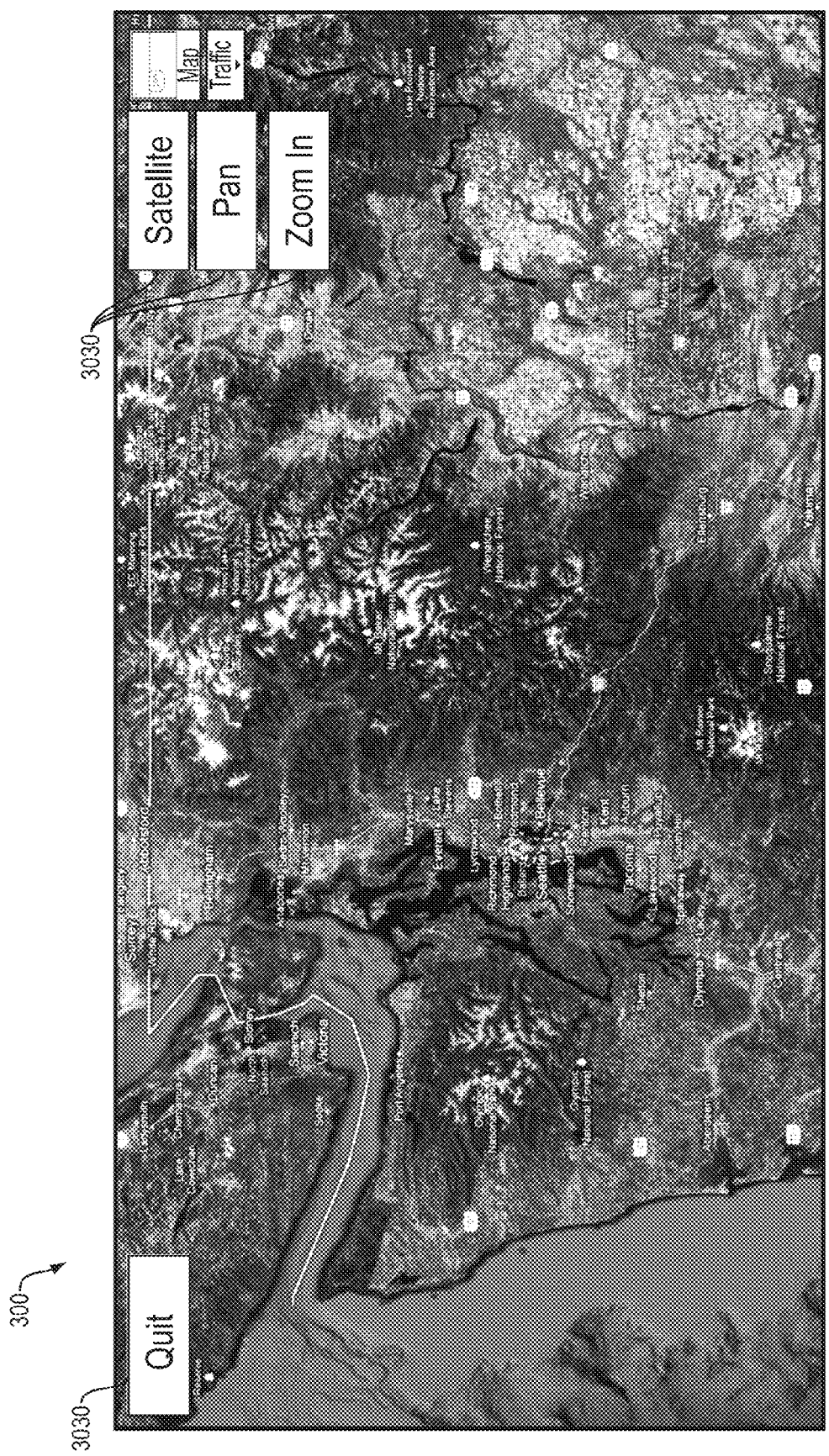

FIGS. 3A and 3B illustrate an example of executing a native Global Positioning System (GPS) maps-based application on a host computing device 200 (Smartphone or PC) using the headset computing device 100 in accordance to principles of the present invention.

In the present example embodiment, at least for purposes of illustration, the HSC can be equipped with sufficient processing equipment and capabilities to only process display data, monitor user speech and motion input and translate such input into equivalent commands. In the illustrative example embodiment of FIG. 3, the HSC 100 is not equipped with a GPS receiver module and does not have a direct Internet Connection.

The host computing device 200 (e.g., Smartphone or other primary computing device equipped with a GPS receiver) can generate a map screen image based on its current coordinates. Typically, a Smartphone 200 is equipped with a GPS receiver and associated processing software such that the Smartphone 200 can provide its current location. Further, the Smartphone 200 usually is equipped with Internet connectivity to enable the downloading of a relevant map graphic. The map graphic can be post-processed by a second class of application running on the Smartphone such that the post-processed marked-up graphic data is sent to the HSC 100 for rendering and display to the user through field of view 300. The post-processed data can include a set of recognized speech commands 3030 sent in text form to the HSC 100, such as "Satellite", "Pan", "Zoom In", and "Quit", as illustrated in FIG. 3A. The HSC 100, after receiving and processing the marked-up data, can start listening for the user to select one of the commands 3030 by speaking/uttering the same.

While the map is being displayed on the HSC 100 through field of view 300, head-gesture movements can be monitored by the HSC 100, translated to equivalent touch-screen or keyboard (physical or virtual) commands and fed directly back to the Smartphone 200 via the bi-directional communications link 150 for processing in accordance with the GPS map-based application. For example, if the user's head is moved left, then the Smartphone 200 may pan the map left and send an updated graphic to the HSC display 1010. In this way Smartphone 200 can perform the processing work, while the HSC 100 can provide an auxiliary display and user interface.

At the same time the user may speak a valid recognized command 3030, such as "Satellite". The user may be made aware that "Satellite" is a valid command by being visually or audibly prompted through the HSC 100 processing the marked-up data produced from the Smartphone application, which when processed by the HSC 100 instructs the HSC 100 to listen for valid commands 3030. In recognizing the command word "Satellite" the HSC 100 can turn the spoken language into an equivalent digital command and send the digital command back to the Smartphone 200. The Smartphone 200 can then respond to the received equivalent digital command by generating a new map view and sending the new generated view to the HSC 100 for display through the field of view 300 of the micro-display 1010, as is shown in FIG. 3B. As such, the Smartphone 200 does not need to have voice recognition capabilities; this functionality can be handled by the HSC 100.

It is further envisioned that an end-user of the HSC 100 can select from an array of native applications stored in the memory or other storage device of the Smartphone 200 for hands-free operation. The HSC 100 user will be able to select which application to operate via an onscreen (HSC screen 300) menu and associated voice commands. Such a menu can be generated by the second class of application and sent to the HSC from the Smartphone 200 in the manner described above. Once executed, the second class of application can determine which native applications are compatible and can be accessed with the HSC 100.

During all of the HSC 100 operations, normal functionality of the host computing device 200 (Smartphone or PC) may continue. Such an approach allows the HSC 100 to be a much simpler device than in previously known (HSC) embodiments without giving up any functionality as perceived by the end-user. Computational intelligence is provided mainly by the host 200. However, it should be understood that all of the advances of the HSC 100 can remain available, such as providing hands-free operation and navigation using head tracking and input commands via combination of head tracking and speech commands, etc.

Figure 4A:
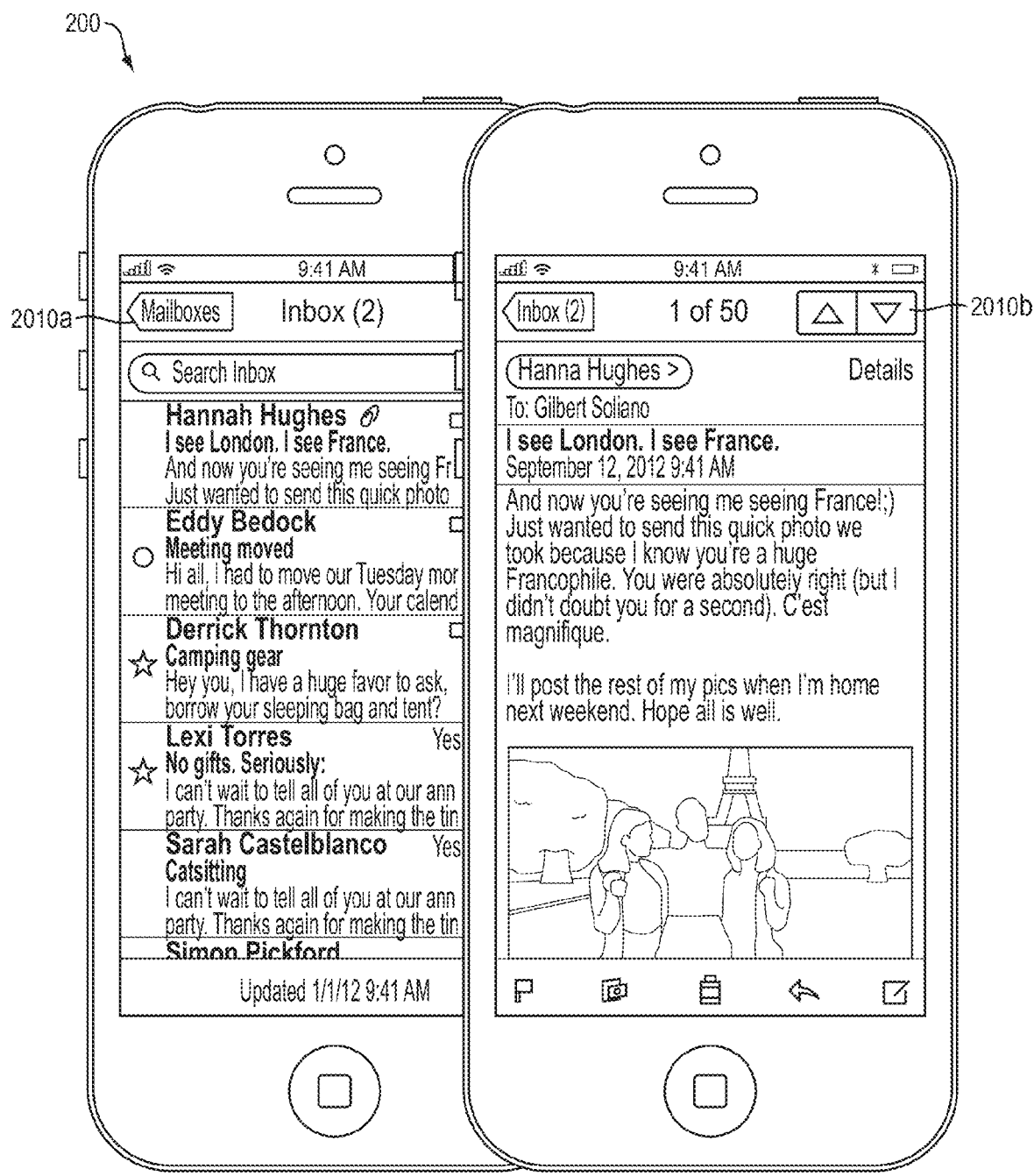
FIGS. 4A-4B illustrate a further example of executing a native application on a host computing device (Smartphone or PC) using the headset computing device in accordance with principles of the present invention.
Figure 4B:
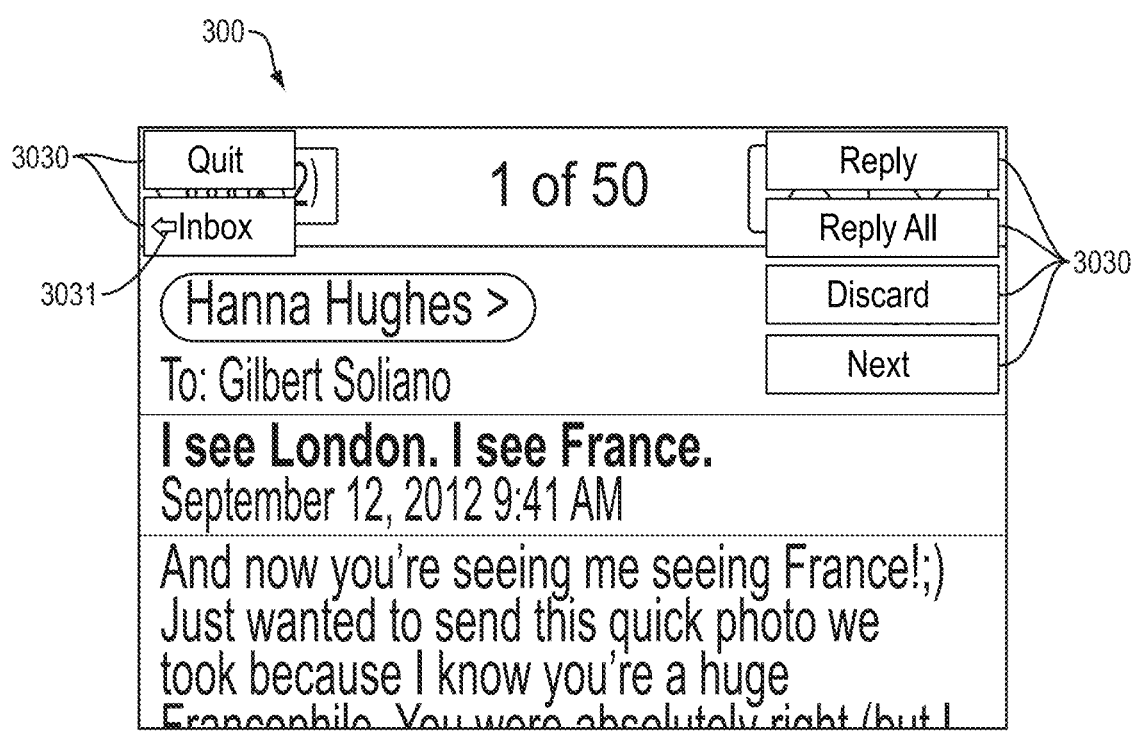

FIGS. 4A and 4B illustrate another example of executing a native application, for example an e-mail application, on a host computing device (Smartphone or PC) 200 using the headset computing device 100 in accordance with principles of the present invention.

In the example of FIGS. 4A and 4B, at least for purposes of illustration, the HSC 100 is equipped with sufficient processing equipment and capabilities to mostly process display data, monitor user speech and motion input and translate such inputs into equivalent commands; the HSC 100 is not equipped with an Internet connection.

The host computing device 200, here depicted as an iPhone®, generates a screen image based on its native e-mail application. (iPhone is a registered trademark of Apple Inc., Cupertino, Calif.) Typically, an iPhone (or Smartphone) 200 is equipped with an e-mail application and associated processing and communications capabilities such that the iPhone 200 can access an e-mail server via an Internet connection. The e-mail application display output 2010a graphic feed is post-processed by a second class of applications running on the Smartphone 200, such that the post-processed marked-up graphic data is sent to the HSC 100 for rendering and display to the user through field of view 300. The post-processed data can include a set of recognized speech commands 3030 sent in text form to the HSC 100, such as "Reply", "Reply All", "Discard", "Next", "Inbox", and "Quit", as illustrated in FIG. 4B. The HSC 100, after receiving and processing the marked-up data can start listening for the user to speak (utter one or more of) the commands 3030.

While the e-mail application is being displayed on the HSC 100 through field of view 300, head-gesture movements can be monitored by the HSC 100, translated to equivalent touch-screen or keyboard (physical or virtual) commands, and fed directly back to the Smartphone 200 for processing in accordance with the e-mail application. For example, if the user's head is moved left—as prompted by arrow 3031, then the HSC 100 generates and transmits a corresponding Smartphone 200 compatable command. In response the Smartphone 200 may return to the "Inbox" and send an updated graphic to the HSC 100 for presentation at display 1010. In this way Smartphone 200 can perform the processing work, while the HSC 100 can provide an auxiliary display and user interface.

At the same time, the user may speak a valid recognized command 3030, such as "Reply" as previously described. Upon recognizing the command words, such as "Reply", the HSC 100 can turn the spoken language into an equivalent digital command and send the generated command back to the Smartphone 200. The Smartphone 200 can then respond to the received equivalent command by generating an updated graphic representing a reply message and send the reply message screen view 2010b (modified for HSC 100 domain) to the HSC 100 for display through the field of view 300 of the micro-display 1010.

Figure 5:
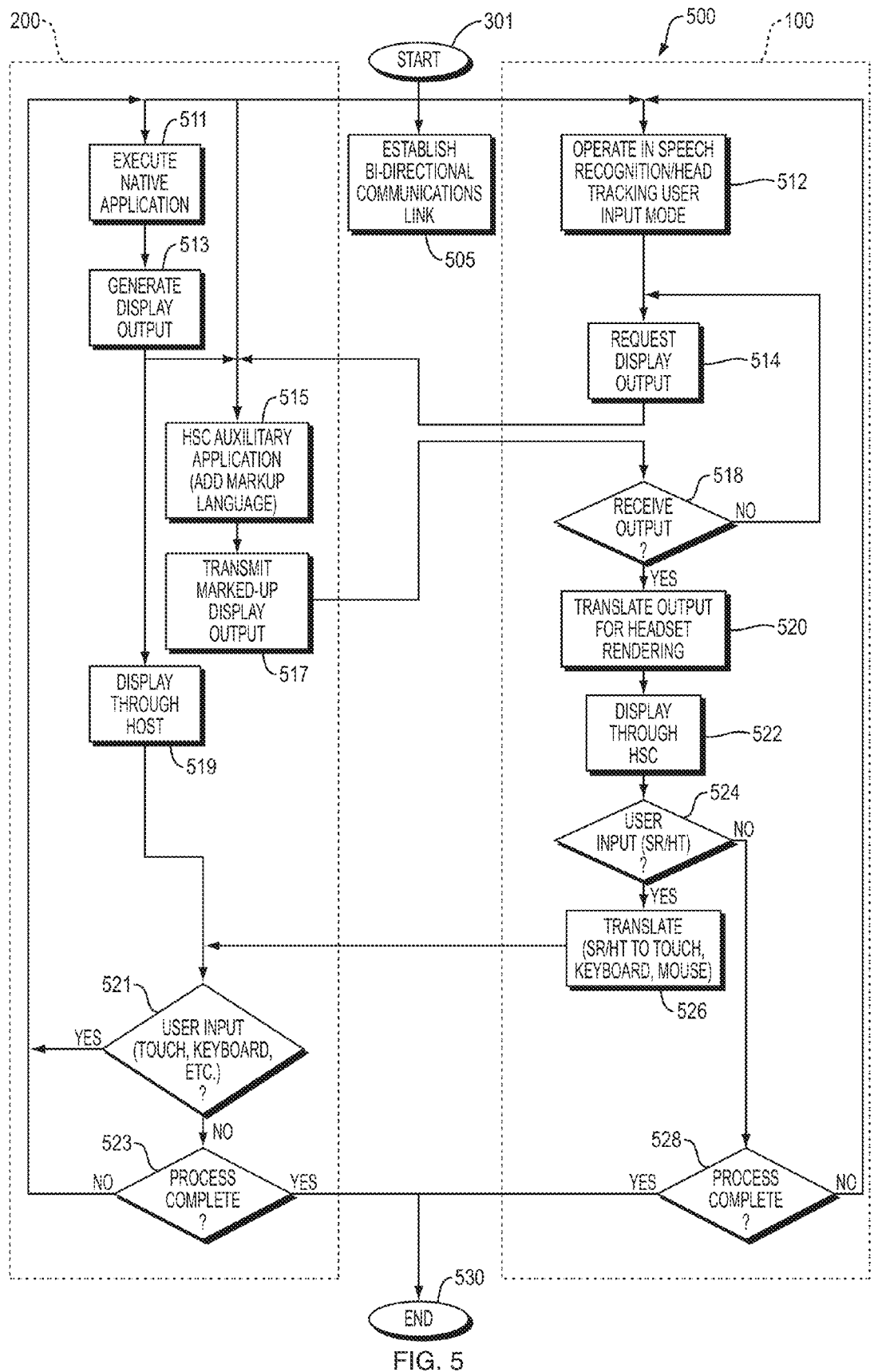
FIG. 5 is a flow diagram illustrating an example method of operating a host application using a headset computer in accordance with principles of the present invention.

FIG. 5 is a high-level flow diagram of a method 500 of operating a host computing device 200 application in accordance with principles of the present invention. In the first step, the method commences (step 501). Thereafter, the host device 200 can execute a native application (step 511), which then can generate a feed of output images, also referred to as display output (step 513). The generated feed of output images can be displayed through the host display screen (step 519) in an appropriate format. Next, user input at device 200 can be monitored for user instructions (e.g., control commands) to be executed by the native application (step 521). If user commands are detected, such as touch-screen inputs or typed inputs, then such commands can be executed according to the native application (step 511). Otherwise, it is determined whether the host 200 process is completed (step 523). If the process is not yet complete, execution can continue according to the native application (step 511). If the process is complete, then the method can end (step 530).

In parallel with steps 511 and 513 (or in series—before or after), a bi-directional communications link can be established between host device 200 and HSC 100 (step 505). Also in parallel with steps 511, 513, and 505 (or in series—before or after), the HSC 100 can be operated in an automatic speech recognition (ASR) and head tracking (HT) mode of operation during which end-user input (e.g., spoken verbal commands and/or head motion) is monitored and recognized as user commands 512. After beginning operation in ASR/HT mode 512, HSC 100 can request display output from host 200 (step 514) of the executing native application on host 200.

The HSC Auxiliary application, a second class of application, can receive the input request from the HSC 100 and the display output generated by the executed native application and then append mark-up instructions to the display output data (step 515). The appended marked-up display data can then transmitted to the HSC 100 via the established communications link (shown as 150 in FIG. 2) (step 517). The HSC 100 can next determine whether the display output (as modified/marked-up by host 200) was received (step 518). If the output was not received, then the request can be made again (step 514). If the output was received, then the received display output data can be translated for rendering through the micro-display 1010 (step 520).

Next, the translated data is rendered and displayed through the HSC display (for example, micro-display 1010) (step 522). Displaying the output generated by the native application though the host display (step 519) and through the HSC display (step 522) can occur substantially simultaneously but in respective domains/formats. After displaying the output generated by the native application though the HSC display (step 522), HSC 100 determines whether user input (ASR/HT) at the HSC has been recognized (step 524). If end-user input (ASR/HT) at HSC 100 has been detected (at step 524), then such input can be translated to equivalent host device 200 commands and transmitted to the host device as user input (step 526). If no end-user input at HSC 100 is determined, then HSC 100 determines whether the HSC 100 process is completed (step 528). If the process at HSC 100 is not yet complete, the process can continue to operate according to the ASR/HT mode (step 512). If the HSC 100 process is complete, then the method can end (step 530).

Figure 6:
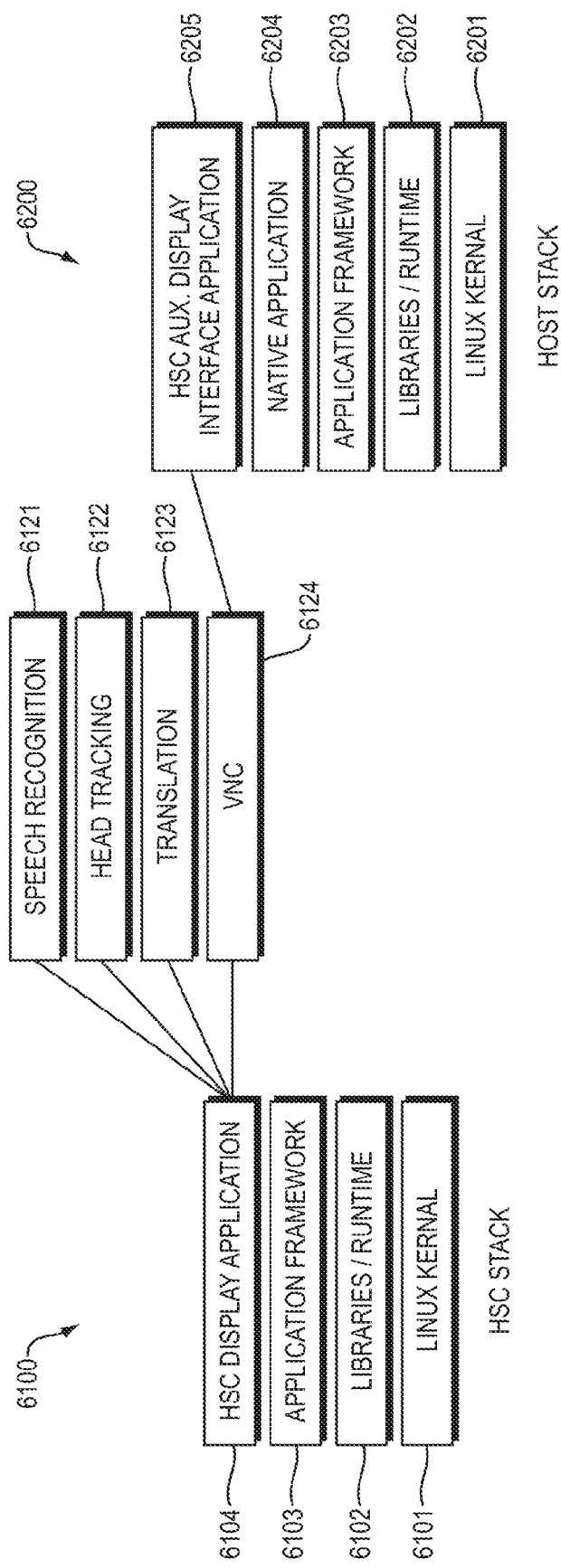
FIG. 6 is a high level software diagram illustrating an example embodiment of how a headset computing device using a speech recognition and head tracking user interface may be used to control an application executed on a host computing device.

FIG. 6 is a high level software diagram indicating how a HSC 100 using a speech recognition and head tracking user interface may be used to control an application executed on a host computing device 200. A HSC software stack 6100 can include a kernal of an operating system (OS), such as a Linux kernal 6101, libraries and runtime libraries for implementing functions built into the programming language during the execution of an application, such as those of Libraries/Runtime stack 6102, application framework for implementing the standard structure of an application, such as Application Framework 6103, and an application which can run on top of the OS kernal, libraries and framework, such as HSC Display Application 6104. The HSC Display Application 6104 can allow the end-user to use the HSC 100 as an auxiliary display and hands-free user-interface and can contain an icon and menuing interface.

Applications running within the context of the HSC Display Application 6104 may include a Speech Recognition input 6121, Head Tracking input 6122, translation module 6123 for translating marked-up display output (from Host 200) and for translating ASR/HT input (at HSC 100) to equivalent Host 200 commands, and Virtual Network Connection 6124, which allows a bi-directional communications link between the HSC 100 and host device 200 to be established.

A host software stack 6200 can include a kernal of an operating system (OS), such as a Linux kernal 6201, libraries and runtime libraries for implementing functions built into the programming language during the execution of an application, such as those of Libraries/Runtime stack 6202, application framework for implementing the standard structure of an application, such as Application Framework 6203, an application which can run on top of the OS kernal, libraries and framework, such as Native Application 6204, and a second class of application that runs on top of the stack and Native Application 6204, such as HCS Auxiliary Display Interface Application 6205. As described above in detail, the HCS Auxiliary Display Interface Application 6205 can allow the end-user to use the HSC 100 as an auxiliary display and hands-free user-interface to control the Native Application 6204 executing an host 200. Applications running within the context of the HCS Auxiliary Display Interface Application 6205 may include a Virtual Network Connection 6124, which allows a bi-directional communications link between the host device 200 and HSC 100 to be established. The host software stack 6200 can be more extensive and complex than the HSC software stack 6100.

Figure 7:
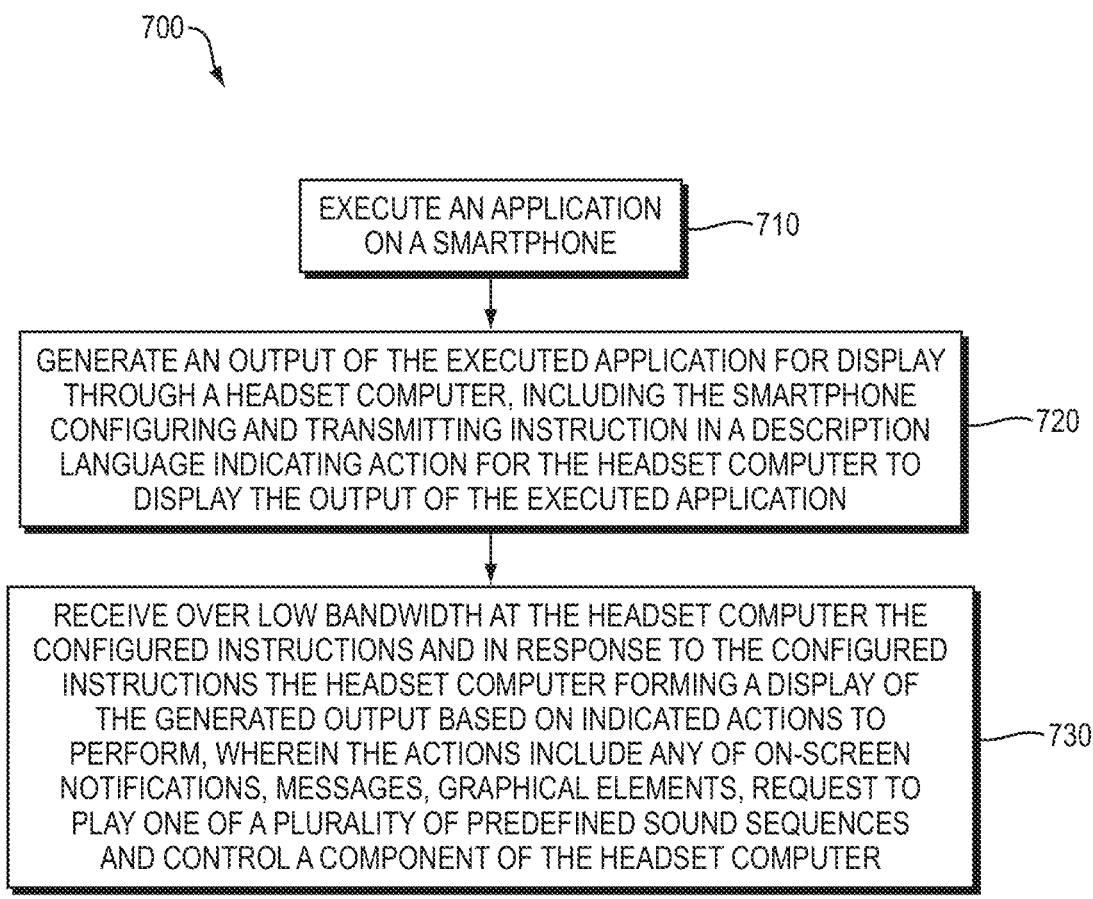
FIG. 7 is a flow diagram of embodiments of the present invention.

FIG. 7 shows a high-level flow diagram of an example embodiment of the present invention. FIG. 7 is a high-level flow diagram illustrating the steps of an alternate method 700 of displaying on a headset computer output from a Smartphone application. The method 700 of displaying on a headset computer output from the Smartphone application 700 can include, executing an application on the Smartphone (step 710), generating output of the executed application for display through a headset computer, including the Smartphone configuring and transmitting instructions in a description language indicating actions for the headset computer to display the output of the executed application (step 720), and receiving over a low bandwidth communications link at the headset computer the configured instructions, and in response to the received configured instructions the headset computer forming or rendering a display of the generated output based on the indicated actions to perform (the instructions), wherein the actions include any of on-screen notifications, messages, graphical elements, request to play one of a plurality of predefined sound sequences and control a component of the headset computer (step 730).

The actions can be of respective element types and for each element type the instructions can indicate one of a plurality of styles predefined for the headset computer. The styles can be style elements. The formed display rendered in the headset domain can include menu selections and prompts presented in terms of a speech recognition/head tracking user interface. Such menu selections and outputs can be visually and audibly presented to a user. The communications link between the Smartphone and headset computer can be a wireless communications link, for example Bluetooth, Wi-Fi or other communications protocol.

The alternative example process illustrated in FIG. 7 can further include, monitoring for input from a speech recognition/head tracking user interface at the headset computer, in response to receiving the speech recognition/head tracking command input, translating the received speech recognition/head tracking command to an equivalent Smartphone command at the headset computer, and transmitting the equivalent Smartphone command to the Smartphone to control the executed application. Such a method can effectively enable speech (voice command) and hands-free (head motion tracking) user control of the executed application.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of displaying on a headset computer output from a Smartphone applications comprising:
   from an application executing on a Smartphone, generating output of the executing application for display through a headset computer, including the Smartphone configuring and transmitting instructions in a description language indicating actions for the headset computer to display the output of the executing application; and
   receiving over low bandwidth at the headset computer the configured instructions, and in response thereto, the headset computer forming a display of the generated output based on indicated actions to perform, wherein the indicated actions include any of: on-screen notifications, messages, graphical elements, a request to play one of a plurality of predefined sound sequences, and control of a component of the headset computer.

2. The method of claim 1, wherein the indicated actions are of respective element types and for each element type the configured instructions indicate one of a plurality of styles predefined for the headset computer.

3. The method of claim 1, wherein the description language is HTML5 or other markup language.

4. The method of claim 1, wherein the formed display rendered at the headset computer includes menu selections and prompts presented in terms of a speech recognition/head tracking user interface.

5. The method of claim 4, wherein the menu selections and outputs are audibly and visually presented to a user.

6. The method of claim 1, wherein the receiving by the headset computer and the transmitting by the Smartphone are over a wireless communications link.

7. The method of claim 6, wherein the wireless communications link is any of Bluetooth, Wi-Fi or other protocol.

8. The method of claim 1, further including:
   monitoring for input from a speech recognition/head tracking user interface at the headset computer;
   in response to receiving a command input from the speech recognition/head tracking user interface, translating the received speech recognition/head tracking command to an equivalent Smartphone command at the headset computer; and
   transmitting the equivalent Smartphone command to the Smartphone to control the executing application.

9. The method of claim 8, wherein the transmitting by the headset computer effectively enables speech and hands-free user control of the executing application.

10. A Smartphone configured to transmit content for display on a headset computer having a display, comprising:
    a Smartphone;
    an application executing on the Smartphone, the application generating output including instructions configured by the Smartphone in a description language, the instructions indicating actions for the headset computer to display the output of the executing application, wherein the indicated actions include any of on-screen notifications, messages, graphical elements, a request to play one of a plurality of predefined sound sequences, and control of a component of the headset computer; and
    a communications module connected to the Smartphone, the communications module configured to transmit the instructions over low bandwidth to the headset computer.

11. The Smartphone of claim 10, wherein the indicated actions are of respective element types and for each element type the configured instructions indicate one of a plurality of styles predefined for the headset computer.

12. The Smartphone of claim 10, wherein the description language is HTML5 or other markup language.

13. The Smartphone of claim 10, wherein the configured instructions indicate actions for the headset computer to form a display that includes menu selections and prompts presented in terms of a speech recognition/head tracking user interface.

14. The Smartphone of claim 13, wherein the menu selections and outputs are audibly and visually presented to a user.

15. The Smartphone of claim 10, wherein the communications module is configured to transmit the instructions over low bandwidth to the headset computer over a wireless communications link.

16. The Smartphone of claim 15, wherein the wireless communications link is any of Bluetooth, Wi-Fi or other protocol.

17. The Smartphone of claim 10, wherein the communications module is further configured to receive Smartphone commands transmitted by the headset computer, said Smartphone commands being (a) able to control the executing application and (b) the equivalent of headset computer commands generated in response to the headset computer receiving input from a speech recognition/head tracking user interface.

18. The Smartphone of claim 17, wherein the received Smartphone commands effectively enable speech and hands-free user control of the executing application by an operator of the headset computer.

19. A headset computer configured to receive content for display from a Smartphone executing a native application generating output, comprising:
    a communications module configured to receive instructions over low bandwidth from the Smartphone, the instructions being in a description language and indicating actions for the headset computer to display the generated output of the executing application, wherein the indicated actions include any of on-screen notifications, messages, graphical elements, a request to play one of a plurality of predefined sound sequences, and control of a component of the headset computer, and
    a display configured to display the generated output.

20. The headset computer of claim 19, wherein the indicated actions are of respective element types and for each element type the configured instructions indicate one of a plurality of styles predefined for the headset computer.

21. The headset computer of claim 19, wherein the description language is HTML5 or other markup language.

22. The headset computer of claim 19, wherein the displayed generated output includes menu selections and prompts presented in terms of a speech recognition/head tracking user interface.

23. The headset computer of claim 22, wherein the menu selections and outputs are audibly and visually presented to a user.

24. The headset computer of claim 19, wherein the communications module is configured to receive the instructions over low bandwidth from the Smartphone over a wireless communications link.

25. The headset computer of claim 24, wherein the wireless communications link is any of Bluetooth, Wi-Fi or other protocol.

26. The headset computer of claim 22, wherein the headset computer (a) monitors for input from a speech recognition/ head tracking user interface at the headset computer; (b) in response to receiving a command input from the speech recognition/head tracking user interface, translates the received speech recognition/head tracking command to an equivalent Smartphone command at the headset computer; and (c) transmits the equivalent Smartphone command to the Smartphone to control the executing application.

27. The method of claim 26, wherein the transmitting by the headset computer effectively enables speech and hands-free user control of the executing application.

28. A system for displaying on a headset computer output from a Smartphone applications comprising:
- a headset computer having a display;
- a Smartphone including a Smartphone communications module;
- a native application, executing on the Smartphone, generating a display output;
- the Smartphone configuring and transmitting instructions in a description language indicating actions for the headset computer to display the output of the executing application; and
- the headset computer receiving over low bandwidth the configured, transmitted instructions, and in response thereto, the headset computer forming one or more screen views of the generated output based on indicated actions to perform, wherein the actions include any of on-screen notifications, messages, graphical elements, a request to play one of a plurality of predefined sound sequences, and control of a component of the headset computer, and displaying said one or more screen views on the display.

* * * * *